United States Patent [19]

Bundschuh

[11] 3,922,005
[45] Nov. 25, 1975

[54] OCCUPANT-PROPELLED VEHICLE AND DRIVE SYSTEM THEREFOR

[75] Inventor: Robert L. Bundschuh, West Simsbury, Conn.

[73] Assignee: Mitsui Mining & Smelting Co., Ltd., Japan

[22] Filed: Mar. 6, 1973

[21] Appl. No.: 338,641

Related U.S. Application Data

[63] Continuation-in-part of Ser. No. 183,147, Sept. 23, 1971, abandoned.

[52] U.S. Cl. ............ 280/237; 280/251; 280/254; 280/282
[51] Int. Cl.² .................. B62M 1/04; B62M 11/04
[58] Field of Search .......... 280/236, 237, 238, 243, 280/251, 258, 282; 180/70 R; 74/218, 217 C; 192/51, 64, 43

[56] References Cited
UNITED STATES PATENTS

| 701,747 | 6/1902 | Manson | 280/257 |
|---|---|---|---|
| 1,503,009 | 7/1924 | Savage | 280/243 |
| 1,562,553 | 11/1925 | Hansen | 280/255 |
| 1,792,045 | 2/1931 | Siefken | 280/251 |
| 2,394,112 | 2/1946 | Schwinn | 192/64 |
| 2,538,060 | 1/1951 | Thomas | 280/243 |
| 2,789,831 | 4/1957 | Verik | 280/257 |
| 3,175,844 | 3/1965 | Whitehouse | 280/255 |
| 3,485,509 | 12/1969 | Searle | 280/243 |
| 3,512,599 | 5/1970 | Hott et al. | 180/70 R |

FOREIGN PATENTS OR APPLICATIONS

| 684,233 | 6/1930 | France | 280/258 |

Primary Examiner—Kenneth H. Betts
Assistant Examiner—John P. Silverstrim
Attorney, Agent, or Firm—Roylance, Abrams, Berdo & Kaul

[57] ABSTRACT

An occupant-propelled vehicle and a manually operated drive system therefor are described. Typically pedal operated, the drive system provides a substantially linear output torque, and makes it possible to apply at least twice the driving power to the vehicle wheel or wheels, for a given manual power input, than has heretofore been possible with pedal operated drives. The pedals or the like are arranged for substantially rectilinear movement and each drives the input shaft of a change speed transmission via the combination of a constant force spring returned reel and a one-way clutch. In preferred embodiments, two pedals can be operated independently, with constant torque supplied independently to two drive wheels of the vehicle.

9 Claims, 20 Drawing Figures

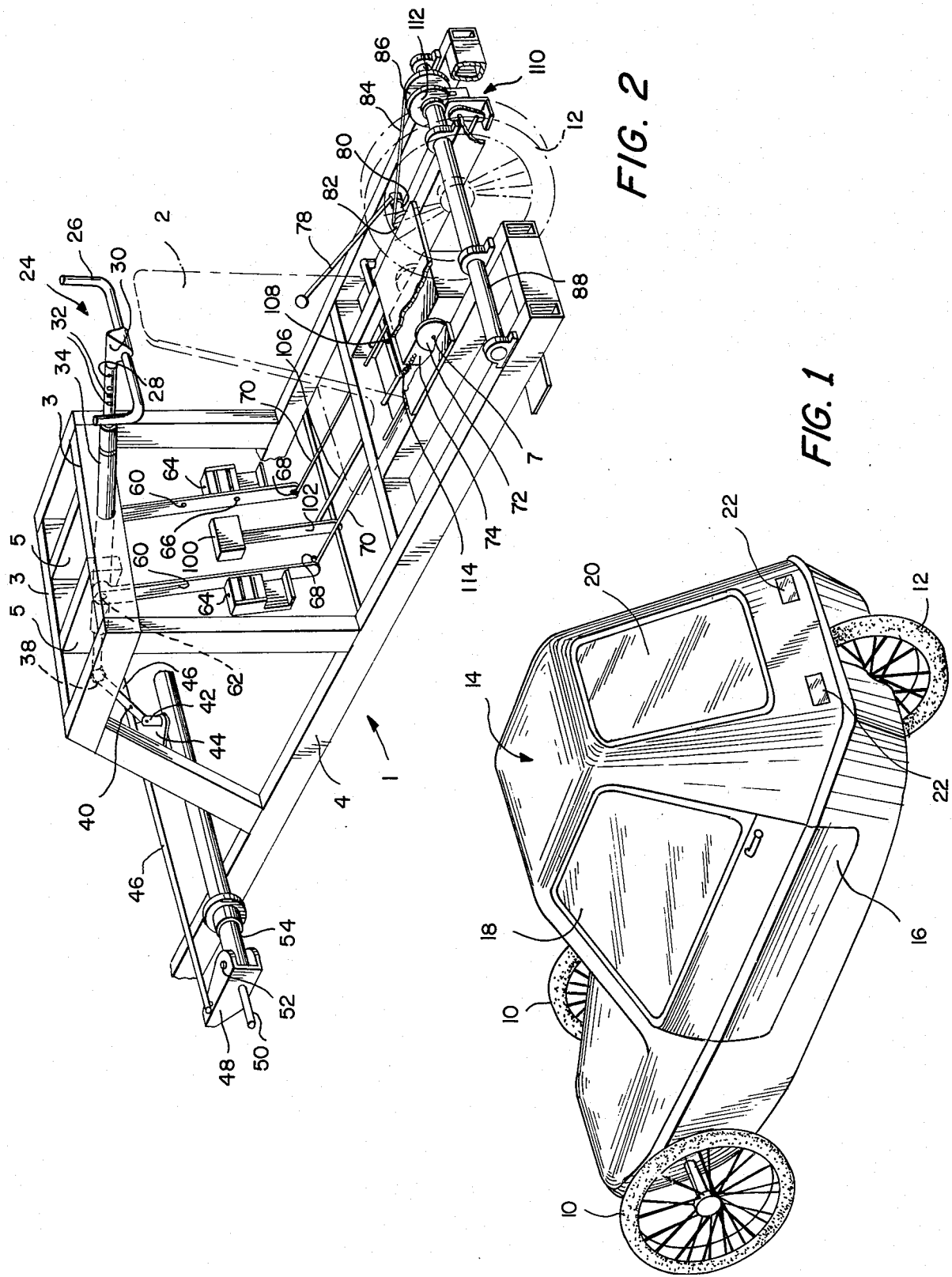

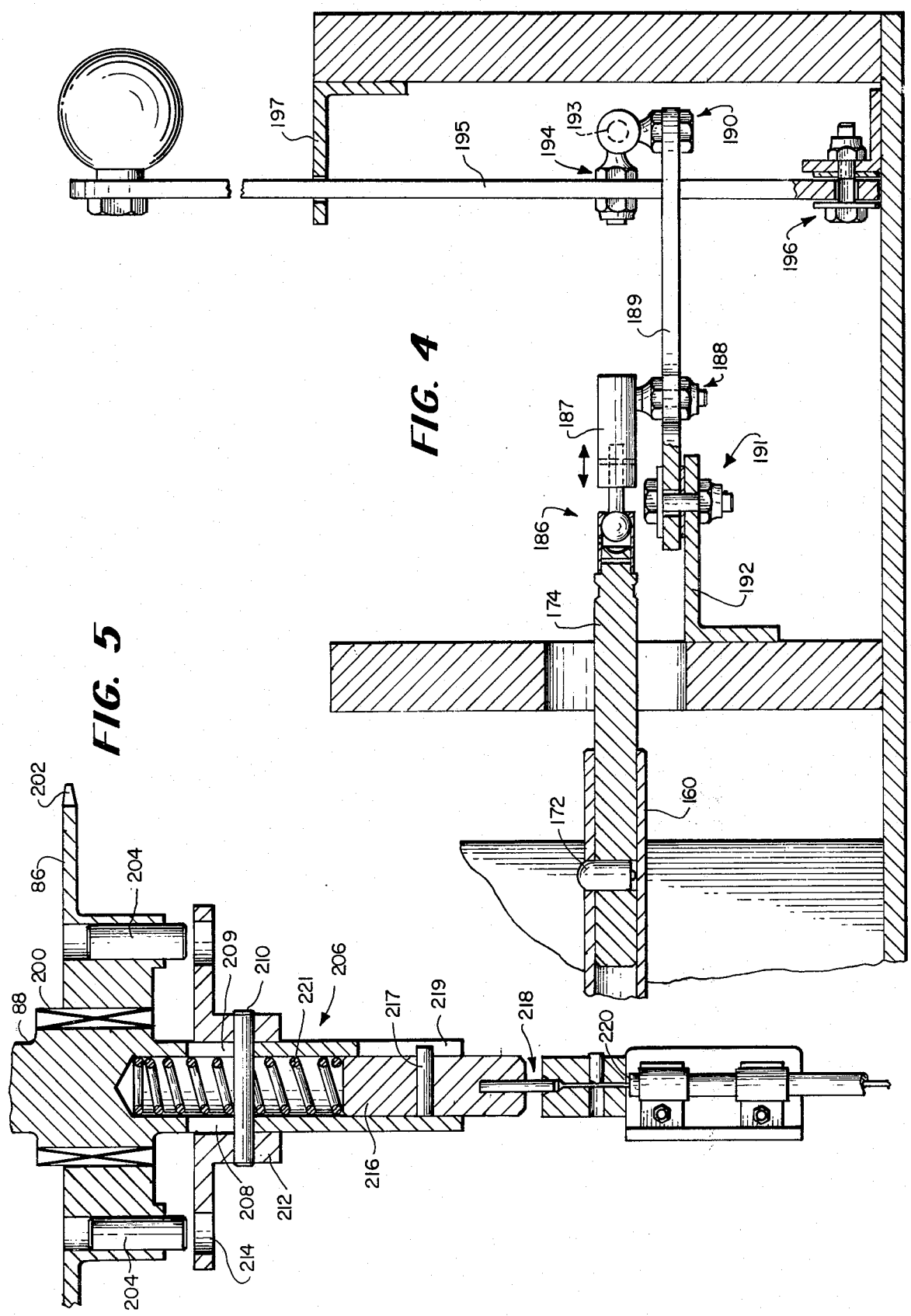

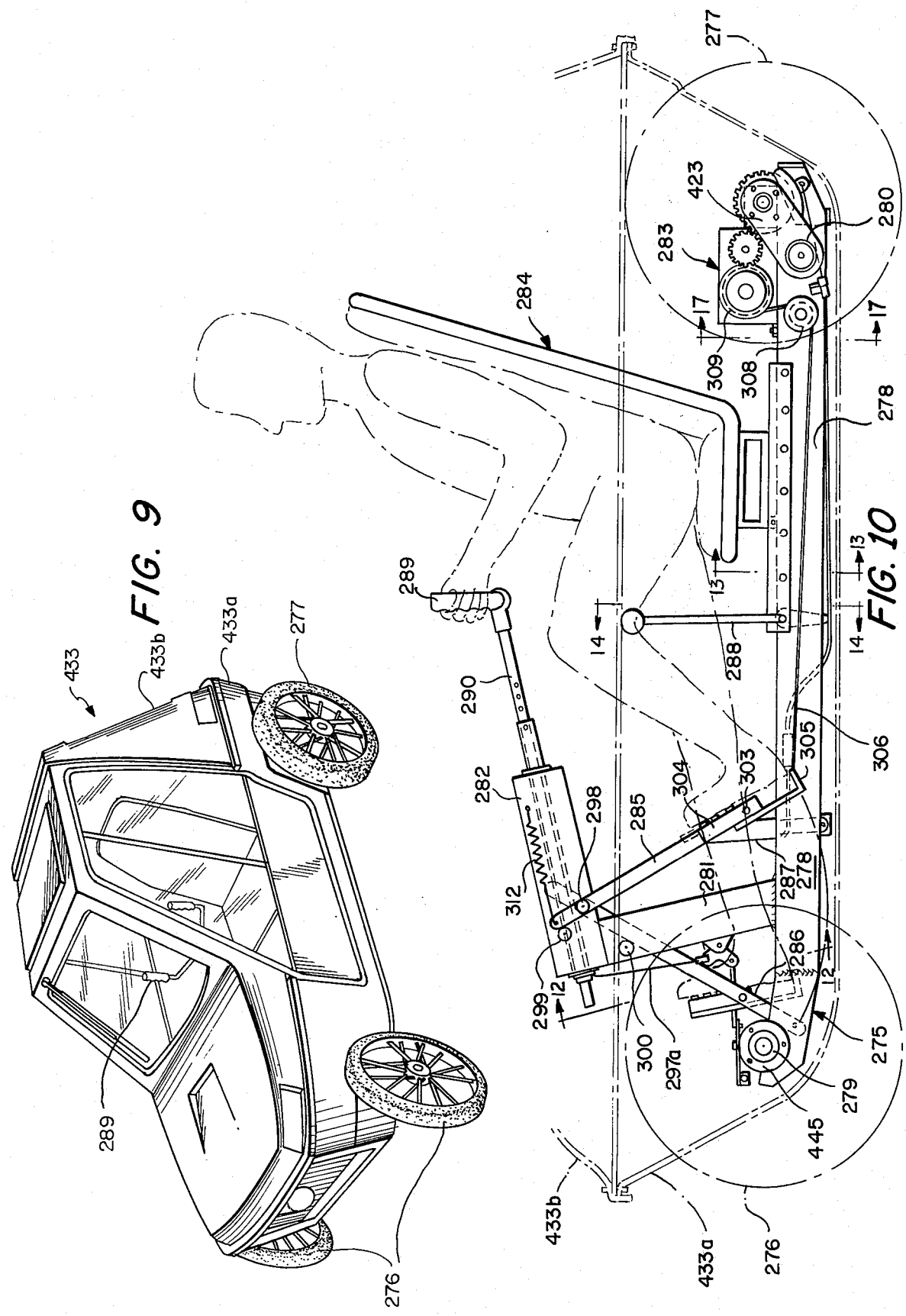

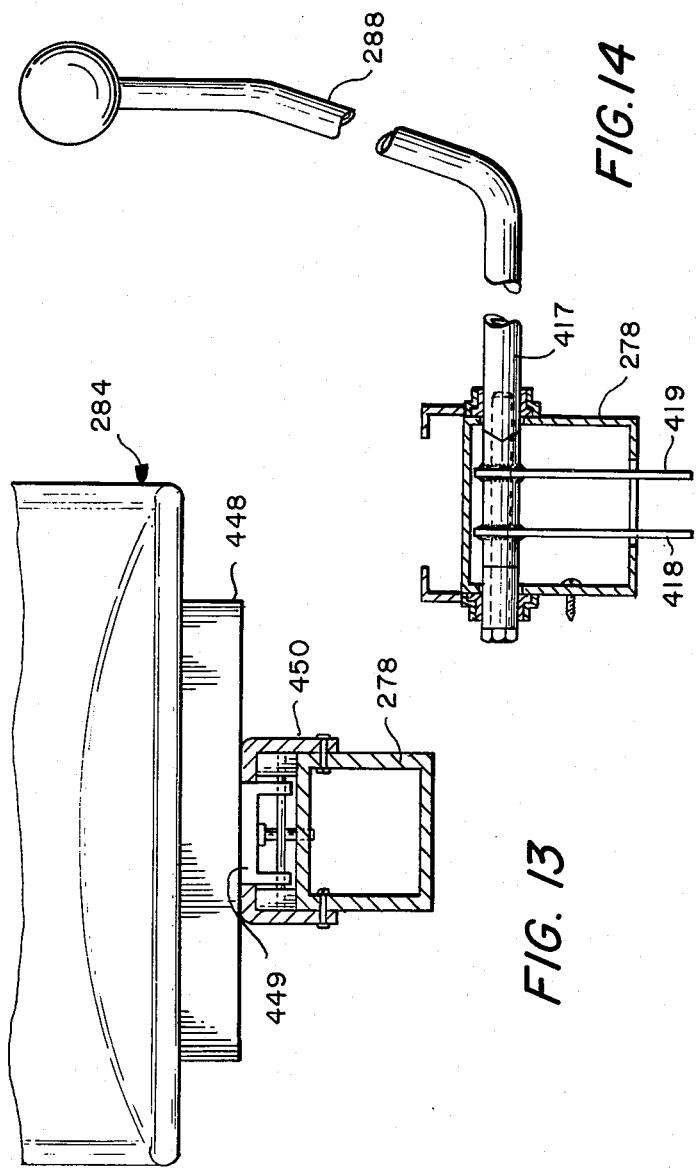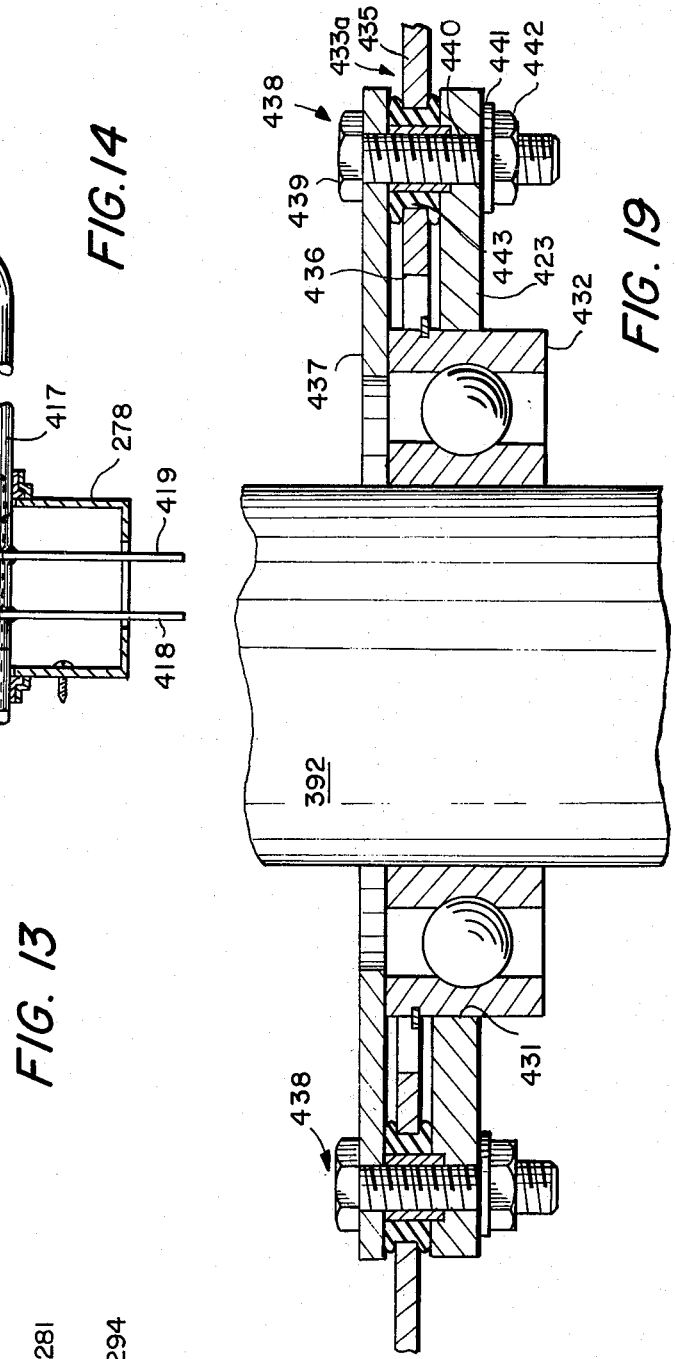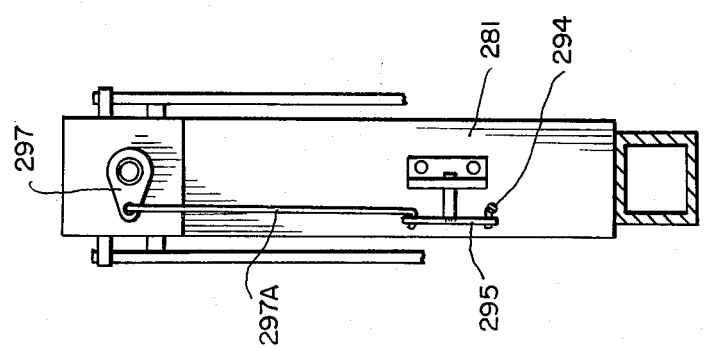

OCCUPANT-PROPELLED VEHICLE AND DRIVE SYSTEM THEREFOR

RELATED APPLICATION

This application is a continuation-in-part of my copending application Ser. No. 183,147, filed Sept. 23, 1971, now abandoned.

BACKGROUND OF THE INVENTION

This invention relates to occupant-propelled vehicles and an improved manually operated drive system therefor.

Prior-art workers have long proposed occupant-propelled vehicles in many forms. Among such devices, pedal operated vehicles have been most successful, particularly when the vehicle, as in the case of the conventional bicycle, is of relatively light weight. However, such devices, and the drive systems employed therein, have had the disadvantage of presenting a cyclically varying output torque, so that the efficiencies of utilization of the limited power supplied by the person operating the device have been unduly low. With relatively light bicycles and the like, the art has been able to accept the disadvantages resulting from inherent non-linearity of the output torque of the drive systems. In more recent times, however, the need for manpowered vehicles which are more broadly useful than, e.g., the conventional bicycle, has brought the disadvantages of the usual pedal operated drive systems sharply into focus and there is accordingly a present and viable demand for improvement in such devices. While many drive systems have been proposed to the usual rotating pedal system, none have been successful. And no occupant propelled vehicle has heretofore been proposed which would be so efficient that added weight for a vehicle body shell, a four-wheel running gear, and other desirable features could be tolerated.

OBJECTS OF THE INVENTION

A general object of the invention is to provide an occupant propelled vehicle which includes a body shell to enclose the occupant or occupants, and a running gear providing greater stability than a bicycle, yet can be operated under normal conditions of grade with approximately the same ease as a conventional bicycle.

Another object is to device such a vehicle equipped with a drive system capable of delivering substantially more power to the driven wheel or wheels, for a given power input from the person operating the vehicle, than has heretofore been possible with pedal operated drive systems.

A further object is to provide a manually operated drive system which can be operated by pedals or the like and which provides a substantially linear output torque.

Yet another object is to devise such a vehicle having two driving wheels and two independently operated pedals, with the drive system so constructed that, when either pedal is operated, linear driving torque is applied to the two driving wheels independently.

A still further object is to provide an occupant propelled vehicle in which the occupant is comfortably positioned to exert maximum force on the operating pedals, and that force is converted with maximum efficiency into a constant driving torque, so that the occupant can propel the vehicle with a level of ease not heretofore attained.

SUMMARY OF THE INVENTION

Vehicles according to the invention embody at least one driving wheel, the occupant operating two pedals alternately, simultaneously, or singularly in substantially straight line fashion, movement of each of the pedals being translated with high efficiency into rotary motion of the input shaft of a change speed transmission via a rotary member and a one-way clutch, i.e., an overrunning substantially zero backlash clutch, the output of the transmission being connected to rotate the driving wheel or wheels. The pedals are arranged for approximately linear movement and are so arranged relative to the seat of the vehicle so as to allow the occupant to apply the maximum amount of force which can be applied by use of the legs. Thus, seated in normal position with back support, the occupant thrusts his legs forwardly, commencing with the knee of the leg raised to approximately the 90° angle, and thrusting forward until the leg is extended approximately horizontally, the foot following a path which approximates a straight, substantially horizontal line. In preferred embodiments, two driving wheels are employed, and the drive sustem is such that operation of either pedal provides a driving torque which is applied independently to the two driving wheels via one-way clutches, i.e., an overrunning substantially zero backlash clutch, which provide a differential-like action.

In order that the manner in which the foregoing and other objects are achieved according to the invention can be understood in detail, particularly advantageous embodiments thereof will be described with reference to the accompanying drawings, which form part of the original disclosure hereof, and wherein:

FIG. 1 is a perspective view of an occupant-propelled vehicle according to one embodiment of the invention;

FIG. 2 is a perspective view of the steering and propulsion systems of the vehicle of FIG. 1;

FIG. 4 is a vertical sectional view of the gear shifting mechanism employed in the vehicle of FIG. 1;

FIG. 5 is a sectional view of a reversing mechanism employed in the vehicle;

FIG. 9 is a perspective view of a vehicle according to another embodiment of the invention;

FIG. 10 is a side elevational view of the vehicle of FIG. 9 with the body shell indicated in broken lines;

Figure 18:
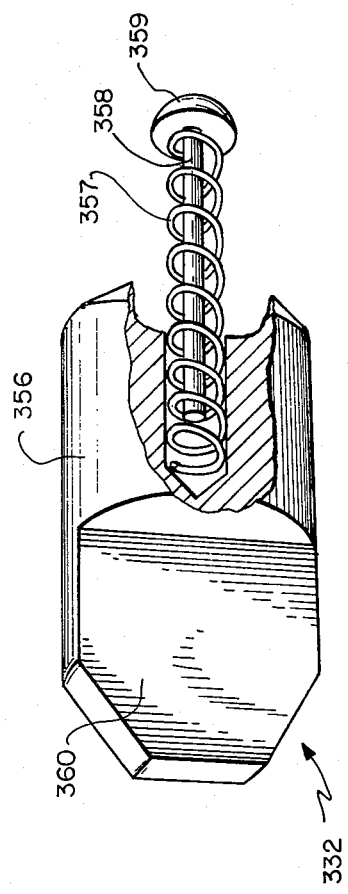
Figure 15:
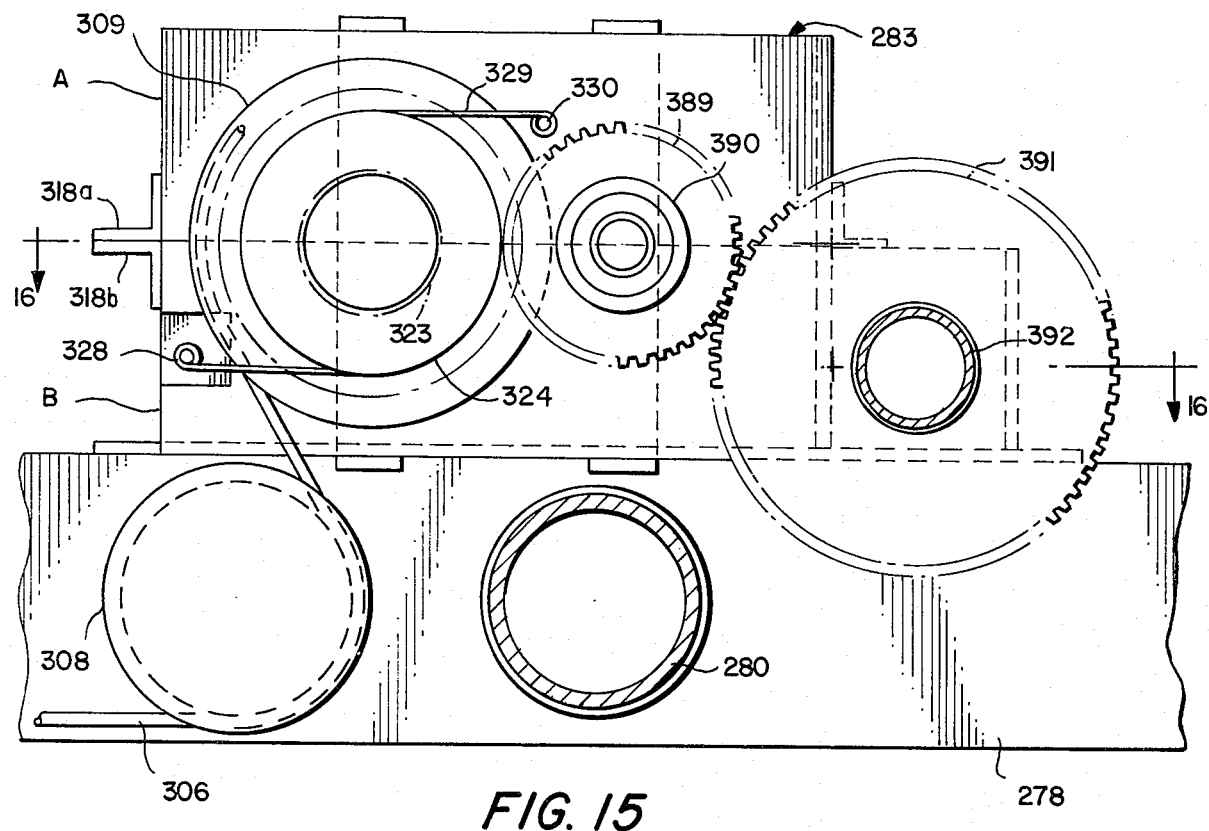
Figure 17:
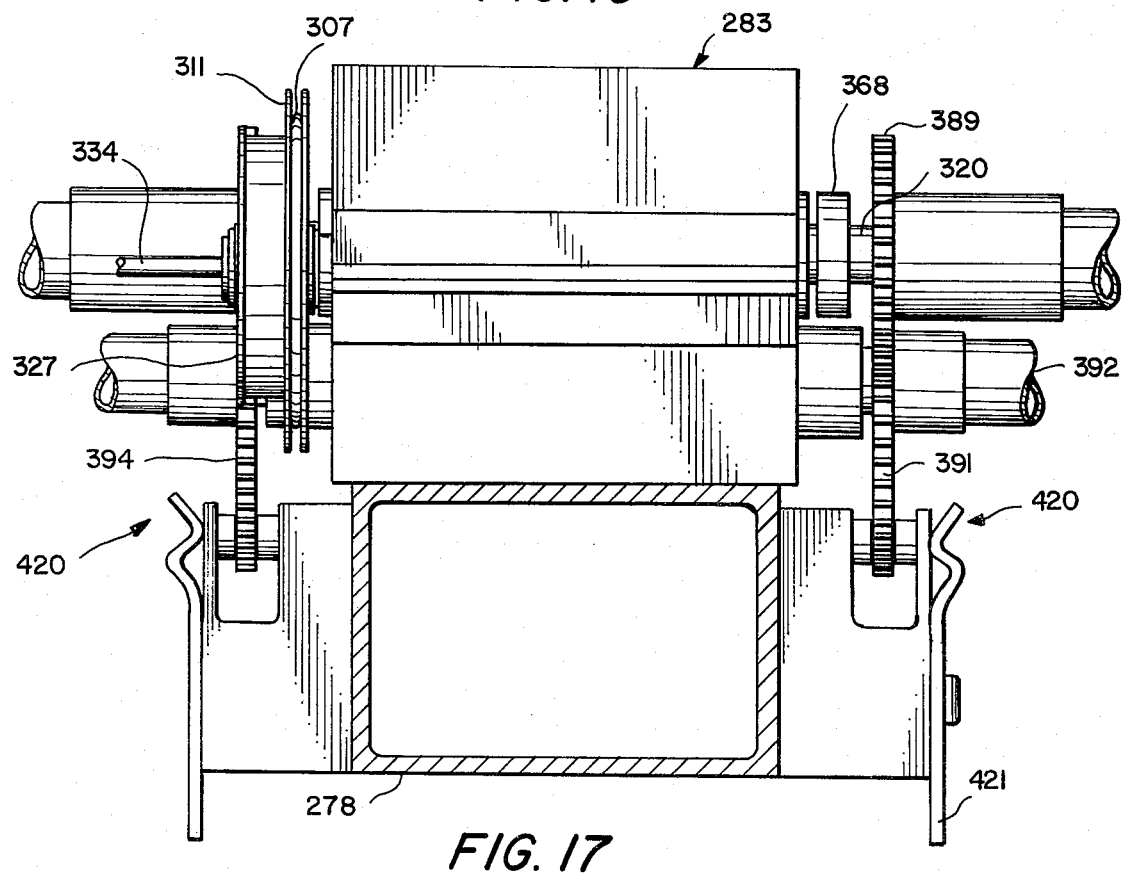
Figure 16:
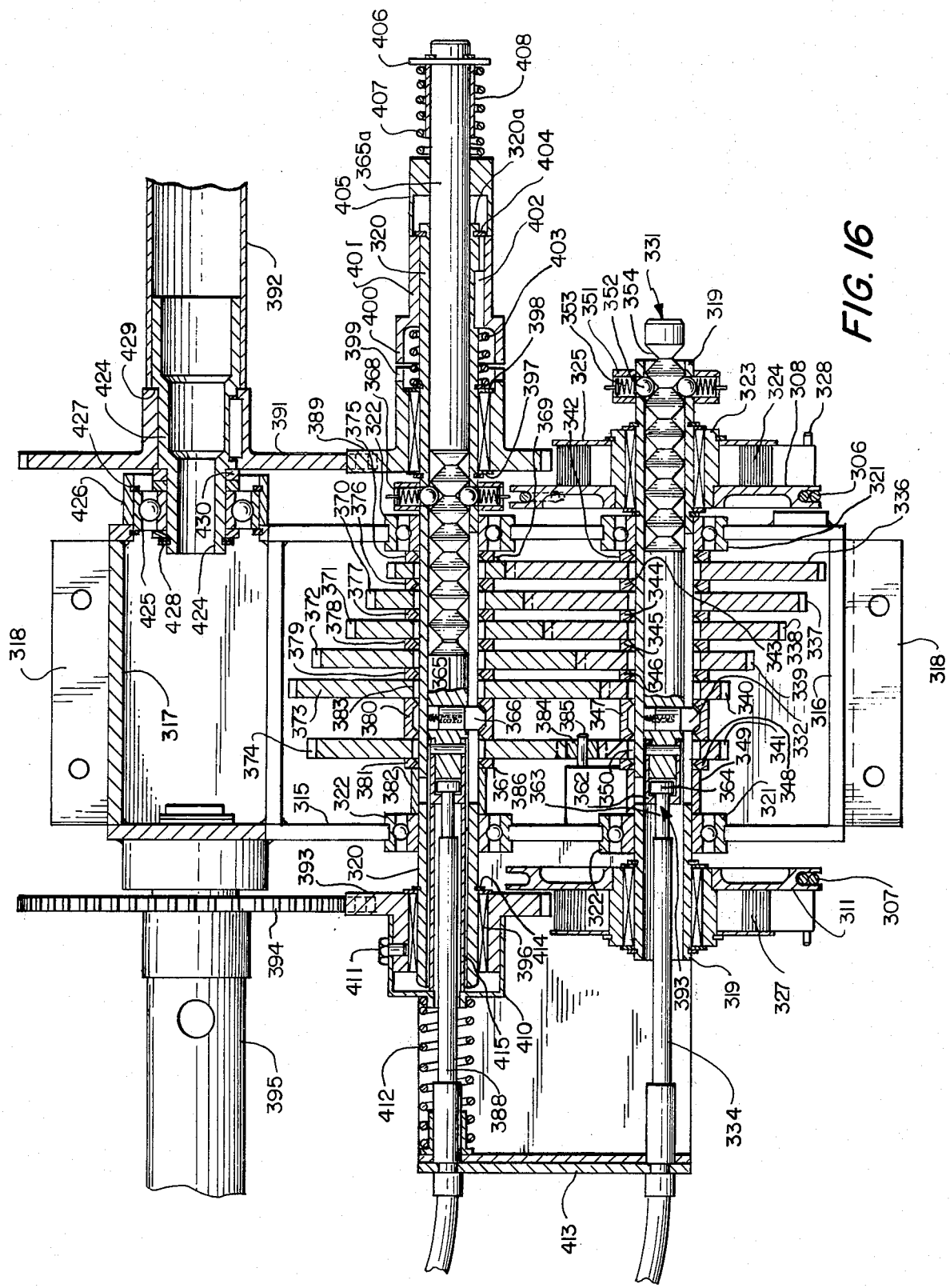
Figure 16A:
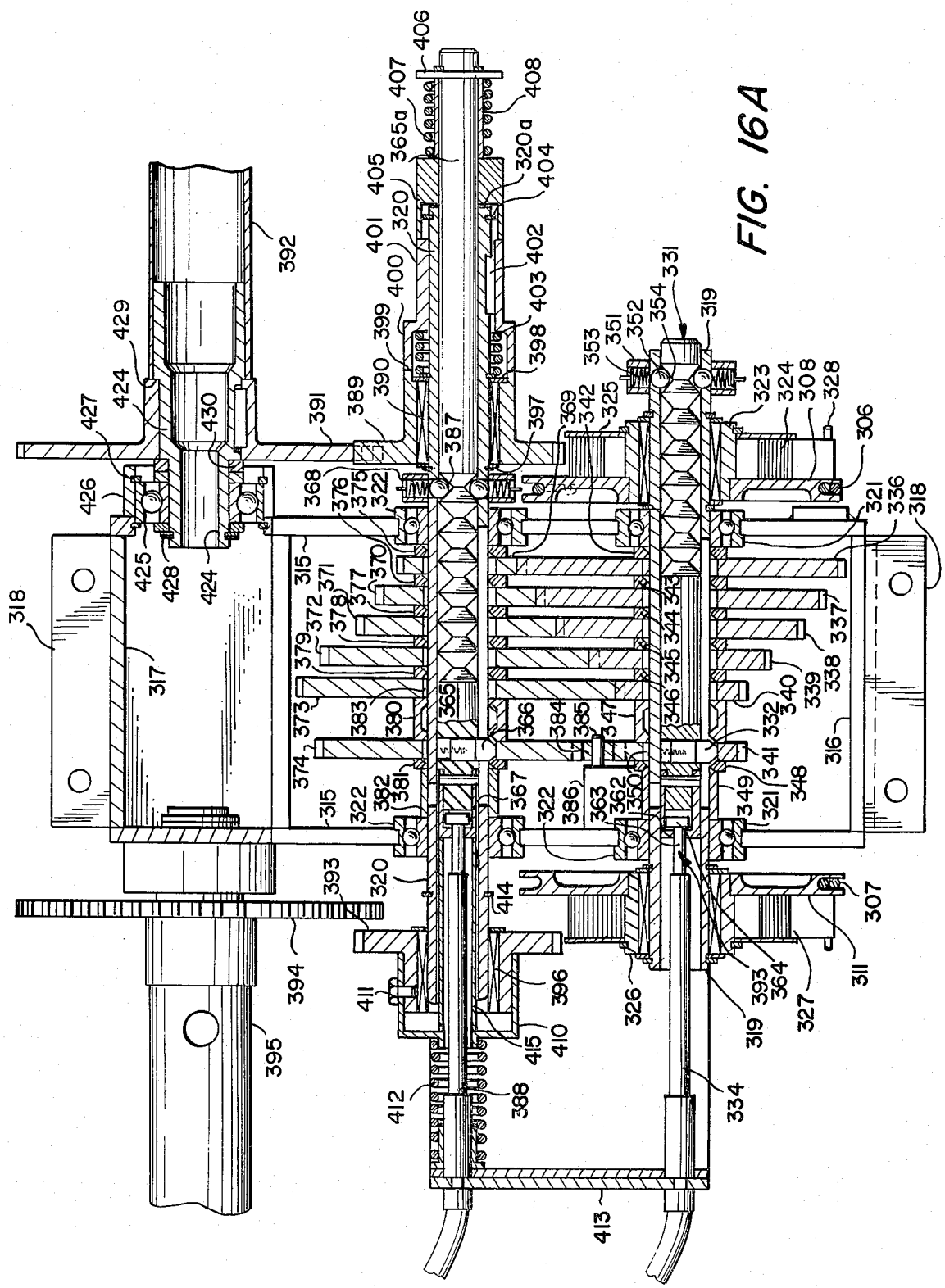

FIGS. 12, 13 and 14 are transverse views taken generally on lines 12—12, 13—13 and 14—14, FIG. 10, respectively;

FIG. 15 is a side elevational view of the transmission employed in the vehicle of FIGS. 9–14;

FIG. 16 is a horizontal sectional view taken generally on lines 16—16, FIG. 15, illustrating parts of the transmission in positions occupied when the transmission is in neutral;

FIG. 16A is a view similar to FIG. 16 but showing parts in positions occupied when the transmission is in reverse;

FIG. 17 is an end view of the transmission of FIGS. 15–16A, taken generally on line 17—17, FIG. 10;

FIG. 18 is a perspective view of a key forming part of the transmission; and

FIG. 19 is an enlarged fragmentary sectional view illustrating the manner in which the body shell is mounted on the vehicle frame and also showing one of the rear axle bearings.

EMBODIMENT OF FIGS 1–5

FIGS. 1 and 2 illustrate generally a vehicle according to one embodiment of the invention, the vehicle being of three-wheeled configuration. A frame indicated generally at 1, FIG. 2, supports a seat 2, two steerable front wheels 10, a single rear driving wheel 12, the drive system, including pedal levers 60 and transmission 74, and a body shell 14 which encloses the occupant and the functional components of the vehicle. Formed and mounted as later described, the body shell includes a windshield, a door 16 including one of two side windows 18, a rear window 20 and rear lights or reflectors 22.

The steering mechanism, indicated generally at 24, FIG. 2, comprises a handle member 26 secured to a tubular shaft 28 by a clamp 30. Clamp 30 fits over and is secured to one end of shaft 28 and is rigidly attached to the central portion of handle member 26. Shaft 28 has a plurality of longitudinally spaced diametrically aligned pairs of holes 32 so oriented that the axes of all the holes lie in a common plane. A tube 34 is supported by bushings in frame cross members 3 and has an inside diameter to telescopically accommodate shaft 28. The end of the shaft 28 is inserted into one end of the tube 34 and a pin 36 is passed through both the tube 34 and one set of aligned holes 32 in the shaft 28, securing the shaft 28 to the tube 34. The handle member 26 can thus be positioned to or further from the vehicle operator by selecting the particular holes 32 through which the pin 36 is passed.

At its other end, tube 34 is provided with a universal joint 38 which interconnects tube 34 and a tubular member 40. Tubular member 40 extends downwardly from the forward end of the tube 34 and is connected to a universal coupling 42 attached to a triangular actuator plate 44. Plate 44 is a substantially planar body positioned in a substantially horizontal plane with the coupling 42 attached at one apex and two tie rods 46 connected each to a different one of the other apices of plate 44. Each tie rod 46 is connected at its other end to an axle support member 48 which carries a wheel supporting axle 50. Axle support member 48 is mounted to pivot about a vertical pin 52 which passes through a horizontal transverse member 54 which is rigidly secured to longitudinal side members 4 of frame 1.

The direction of the vehicle is controlled by the movement of the handle member 26 about the axis of shaft 28. Rotary motion of tube 34 is transmitted through the universal joint 38 to the tubular member 40. The actuator plate 44 is, consequently, rotated about a substantially vertical axis and such movement causes the tie rods 46 to pivot the axle support members 48 about pins 52 with attendant movement of the wheels 10.

The drive system illustrated in FIGS. 2–comprises a pair of spaced lever arms 60 which are each mounted on a different one of frame members 5 to swing about a pivot point indicated at 62, FIG. 2, which is located at the upper end of the lever arm and a substantial distance above the plane of longitudinal frame member 4. A pedal 64 is pivotally attached to each lever arm 60 for swinging movement about a horizontal pivot shaft 66 spaced well below the axis defined by pivot points 62. At the extreme lower end of each of the lever arms 60 is a cable connection 68 in the form of a clevis or the like for securing one end of a cable 70 to the lever arm 60. Each cable 70 extends rearwardly from the cable connection 68 to a cable reel 72 which is located outside of the transmission indicated generally at 74 and mounted on the input shaft 76 of transmission 74 by a conventional one-way clutch 142, FIG. 3. Each cable 70 has one end portion wound on the respective reel 72, and the one-way clutches 142 are oriented to connect reels 72 to shaft 76 only when the reel is turned in a direction to unwind the cable. The transmission is provided with a gear shift lever 78 and an output shaft 80 to which the output drive sprocket wheel 82 is secured. A chain 84 connects between sprocket wheel 82 and a rear axle drive sprocket wheel 86 secured about the rear axle 88 through a one-way clutch.

The drive mechanism will cause wheel 12 to rotate whenever one of the pedal means 64 is thrust in a forward direction, as indicated at 90. Forward movement of pedal 64 causes the lever arm 60 to pivot about the pivot point 62, unwinding cable 70 to impart a rotary motion to the input shafft 76. Transmission 74 converts the rotary motion at the input shaft 76 into rotary motion of output shaft 80 at a different selected speed. Rotation of the output shaft 80 causes the output drive sprocket 82 to rotate and impart motion to the chain 84 and the axle drive sprocket 86. By a means to be shown later, the removal of an external force in the forward direction 90 from the pedal 64 will permit a restoring means to cause the cable reel 72 to rotate in a counterclockwise direction as viewed in FIG. 2, causing the cable 70 to be wound again onto the cable reel 72. The rewinding of the cable upon the cable reel 72 causes the lever arm 60 to return to the initial position shown in FIG. 2.

The vehicle is provided with a braking system which includes a brake pedal 100 mounted at one end of a brake lever 102, lever 102 being mounted to pivot about a horizontal axle 104 secured to the frame members 4. A brake cable 106 is connected at one end to the brake lever 102 and at the other end to a pivotally mounted brake operating lever 108. The brake operating lever 108, when pivoted in a counterclockwise direction, as viewed in FIG. 2, activates a conventional disc brake mechanism, shown generally as 110, to apply a braking force upon a disc 112 secured to rear axle 88. A suitable brake restoring spring indicated at 114 is provided.

Figure 3:
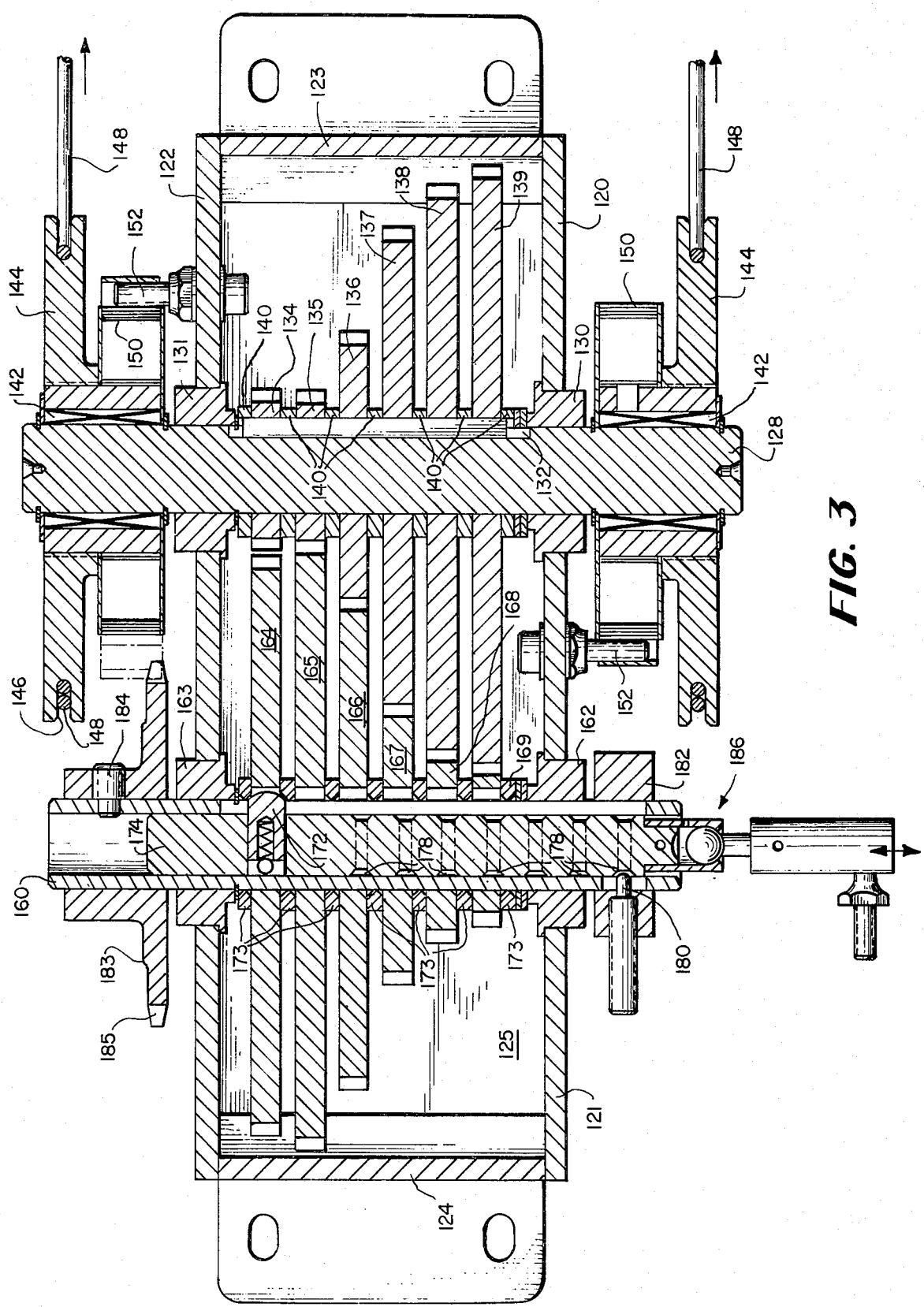
FIG. 3 is an axial sectional view of a transmission employed in the vehicle of FIG. 1.

Transmission 74 is shown in greater detail in FIG. 3, and comprises a housing indicated generally at 120 and including side walls 121, 122, a front wall 123, a rear wall 124, a bottom 125 and a top wall 119 which, as seen in FIG. 2, is laterally extended and secured rigidly to parallel frame member 6.

Input shaft 76 extends transversely of side walls 121, 122 and is journalled therein by bushings 130 and 131. A longitudinal keyway slot 132, within which a mating key 133 is positioned, is provided in shaft 76. Within casing 120, shaft 76 carries a plurality of gears 134–139, each gear being provided with a central opening, through which shaft 76 extends, and a radial key slot to cooperate with key 133 to secure the gear against rotation relative to the shaft.

Also carried by shaft 76 are a plurality of spacer members 140, each in the form of a substantially circular ring with an outer diameter smaller than the diameter of the smallest of gears 134–139. Each member 140 is located between a different pair of the gears 134–139. Each spacer member 140 has a key slot dimensioned to mate with key 133.

Shaft 76 is substantially longer than the space between casing walls 121 and 122 and is centered with respect thereto so that the end portions of the shaft project outwardly beyond the respective side walls of the casing. A conventional one-way clutch 142 is secured to each reel 72 and embraces the corresponding end portion of shaft 76. A constant force spiral rewind spring 150 extends in spiral fashion around the input drive shaft 76 and has its inner end secured to the drive cable reel 72 and its outer end secured to a pin 152 rigidly secured to the respective casing side wall.

In operation, unwinding of either cable 70 from its reel 72 will cause the reel 72 to rotate in a clockwise direction (as viewed from the left in FIG. 3). Since each clutch 142 is constructed and arranged to connect the cable reel and shaft 76 when the reel 144 is rotated to unwind the drive cable, the unwinding of either cable 70 will cause the input shaft to rotate in the same direction. The gears 134-139, being secured to the input drive shaft 128 by the key 133, will also rotate in a clockwise direction as viewed from the left in FIG. 3. For each one-way clutch 142, the constant force spring 150 is designed to be tightened or wound by the unwinding of cable 70 from the reel 72. When the unwinding force is removed from the cable, the spring 150, having been wound by the removal of cable from cable reel 72, will provide a force sufficient to rotate the cable reel 72 in a counterclockwise direction as viewed in FIG. 3 from the left. The one-way clutch 142 is constructed to permit reel 72 to rotate freely in that direction about shaft 76. Consequently, the unwinding of the constant force spring 150 will cause the cable reel 72 to rotate to rewind the drive cable 70.

A tubular output shaft 80 is parallel to shaft 76 and located between that shaft and the rear wall 124 and passes through both side walls 121 and 122. Bushings 162 and 163 are carried by walls 121 and 122, respectively, to permit the output drive shaft 80 to be freely rotatable about its axis. Shaft 80 carries a plurality of gears 164–170, each having a substantially circular central opening of a diameter slightly greater than that of the output shaft, permitting each of the gears 164–169 to be normally freely rotatable relative to the output shaft 80. Each of the central openings of the gears 164–169 is provided with multiple keyways for engagement by a spring biased key 172, later described. Gears 165–169 are meshed with the respective matching ones of the gears 135–139. Gear 164, however, does not mesh with gear 134 directly. Rather, an additional gear (not shown) is provided which is meshed with both gears 134 and 164, providing a reverse gearing.

A cylindrical shifting shaft 174 is provided to move the key 172 selectively into engagement with the different gears 164–169. Shaft 174 has a diameter substantially equal to the inside diameter of output shaft 80 and is slidably disposed therein for axial movement. A rectangular slot 176 is provided in the tubular wall of shaft 80 and extends along a major portion of the length of shaft 160. Key 172 extends generally diametrically with respect to shaft 174 and projects through slot 176. The key 172 is a spring biased rectangular body with a rounded tip 175 which extends radially beyond the outer diameter of the output shaft so that the key 172 can engage the keyways of the gears 164–169.

A plurality of anti-frictional spacer rings 173 are provided, each having an outside diameter smaller than the smallest of gears 164–169 and an inside diameter slightly greater than the outside diameter of the output drive shaft 160. The inner peripheries of spacers 173 are bevelled to coact in camming fashion with the rounded tip 175 of key 172.

Shifting shaft 174 has a plurality of detent holes 178 spaced therealong to be engaged by a spring biased detent 180 which forms a portion of the hub 182 secured on the end portion of the output shaft 80 which extends outwardly from wall 121 of the transmission. At the other end of shaft 80 is a sprocket 183 secured to shaft 80, as by a set screw 184.

Shifting shaft 174 is provided with a ball and socket coupling means, indicated generally at 186, which permits shaft 174 to rotate relative to the actuator, later described, to which it is coupled. Axial movement of shaft 174 causes 172 to contact the bevelled inner peripheries of the spacers 172 which cam the key 172 inwardly to disengage it from the keyway of a preceding gear 164–169, and then engage the keyway of the next succeeding gear, the spring causing the key 172 to engage the keyway when the key 172 and the keyway are properly aligned. At the same time, the spring biased detent 180 will automatically engage a corresponding hole 178 in transmission shifting shaft 174, the latter engagement of the detent 180 insuring the proper alignment of the key 172 with the keyway of the respective gear 174–179. The engagement of key 172 with the gear 164 shown in FIG. 3 represents the required position for the transmission to be in reverse gear. By sliding the transmission shaft 174 to the right so that the key 172 engages the gear 165, the transmission is in the position of first gear. By permitting further rightward sliding of shaft 174, key 172 will engage the gears 166–169 successively, thus changing the transmission from second through fifth gear. Still further rightward movement of shaft 174 is possible, bringing shaft 174 to a position in which key 172 does not engage the keyway of any of the gears 164-169, the transmission then being in neutral.

As seen in FIG. 4, the ball member of coupline 186 is rigidly connected to a pivoted actuating member 187 pivotally connected by means 188 to an L-shaped link member 189 pivotally connected to an operating lever 195 as indicated generally at 190, 193, 194. Pivotal connection 188 is located near the extreme end of one of the arms of the "L" of member 189. At the intersection of the arms of the L is another pivotal connection, shown generally at 191, which permits member 189 to swing about a generally vertical axis passing through the pivotal connection 191 while securing the member 189 to the frame bracket 192. Connection 190 is located at the extreme end of the other arm of the L-shaped member 189.

Gearshift lever 195 is positioned substantially in a vertical plane and is pivoted at its lower end to the frame of the vehicle, as indicated generally at 196, permitting handle 195 to be pivoted about a horizontal axis. Handle 195 passes through a substantially horizontal plate 197 with cut-outs therein for assisting the operator in shifting the gears of the transmission.

The operation of the shifting mechanism of FIG. 4 requires that the handle 195 be moved about the pivotal connection 196 to swing member 189 about the pivotal connection 191. Since the end of the L-shaped member 189 through which the pivotal connection 188 passes is moved generally to the right or left as viewed in FIG. 4, the interconnected shaft 174 can correspondingly be drawn to the right or pushed to the left, causing the gears to be changed by moving the key 172 from engagement with one gear to engagement with another.

Referring now to FIG. 5, a portion of the rear axle 88 is shown with the rear drive sprocket 86 and the related apparatus for reversing the drive. Sprocket 86 has a centrally located bore of sufficient diameter to be attached to the outer member of the one-way clutch 200 which embraces axle 88. Sprocket 86 has a radially extending portion with teeth located around the circumference 202 thereof for engaging the drive shain 84, FIG. 2. Sprocket 86 is also provided with a pair of axially extending pins 204 which project from the radially extending portion of the drive sprocket 86 parallel to the axis of rotation of rear axle 88. Rear axle 88 is provided with a tubular portion indicated generally at 206 into which two diametrically aligned slots 208 and 209 are cut. Slots 208 and 209 are positioned to permit a pin 210 to pass therethrough, the slots being axially elongated so that pin 210 is slidable axially therein. Pin 210 is of a sufficient length to extend outwardly in both directions from tubular portion 206 and is secured at each end to a slidable locking member 212 which comprises a substantially disc shaped body with a centrally located hole having an inner diameter slightly greater than the outer diameter of tubular portion 206. Locking member 212 embraces the tubular portion 206 and is slidable in an axial direction therealong, the limits of such axial sliding being determined by the length of slots 208 and 209. Member 212 has diametrically aligned holes 214 each disposed to accommodate a different one of the pins 204 of sprocket 86. Hence, when member 212 is moved relative to tubular portion 206 and toward sprocket 86, pins 204 come into engagement in holes 214 so that sprocket 86 is locked directly to rear axle 88.

Positioned within the tubular portion 206 of the rear axle 88 is a solid cylindrical body 216 carrying a radial pin 217. The cylindrical body 216 has a diameter slightly smaller than the inside diameter of the tubular portion 206 and is of solid and preferably metallic construction. Pin 217 projects radially and is engaged in a longitudinally extending slot 219 in tubular body 206. Attached to the outer end of body 216 is a connector, indicated generally at 218, which forms the connection between a push-pull cable 220 and the cylindrical body 216. The connector 218 is rigidly attached to the cylindrical body 216 but freely rotatably attached to the push-pull cable 218. At its inner end, cylindrical body 216 is engaged by a helical compression spring 221 which extends within the tubular portion 206 from the cylindrical body 216 to the solid wall of the axle 88. The pin 210 passes through the coiled spring 221 at a point which is near the middle of the spring 221 along its longitudinal axis.

The apparatus shown in FIG. 5 permits the rear axle to be driven in the reverse direction whenever the gearshift is placed in the reverse gear. By placing the transmission in reverse gear, the push-pull cable 220 will be pushed in a direction which will force the cylindrical body 216 to move upwardly as viewed in FIG. 5. This latter motion will be translated to the slidable locking member 212 by pin 210. As the slidable locking member 212 moves toward the rear drive sprocket 86, sprocket 86 is positionable so that the pins 204 can engage in holes 214, and rotation of the drive sprocket 86 in reverse direction will be translated to the rear axle 88, permitting the vehicle to be power driven in reverse.

When the vehicle is placed in a forward gear by changing the gearshift from reverse to one of the forward gears, the push-pull cable 212 will be moved in a direction causing decompression of the spring 221 and movement of the slidable locking member 212 away from the rear axle drive sprocket 86. When the pins 204 are no longer engaged with the holes 214, sprocket 86 becomes driveable only in a forward direction because the unidirectional clutch 200 will prevent rearward motion from being transmitted to the rear axle 88. The free wheeling effect of the unidirectional clutch in combination with the rear axle drive sprocket 86 is necessary in order to permit the vehicle to coast without creating a frictional drag from the transmission.

By a mechanism not shown in FIG. 4, the movement of the push-pull cable shown in FIG. 5 for engaging the reversing mechanism is automatically provided in a typical vehicle of the present invention by the gear shifting mechanism. Handle 195, FIG. 4, is provided with a plate for contacting the opposite end of the push-pull cable 220 from the securing bracket shown in FIG. 5. The contact between the plate fixed to the handle 195 and the push-pull cable 220 occurs only when handle 195 is being moved into the reverse position. When handle 195 is moved out of the reverse position, the pressure upon the push-pull cable 220 is removed and spring 221 will force sliding locking member 212 out of engagement with the rear sprocket.

EMBODIMENTS OF FIGS. 6–8

Figure 6:
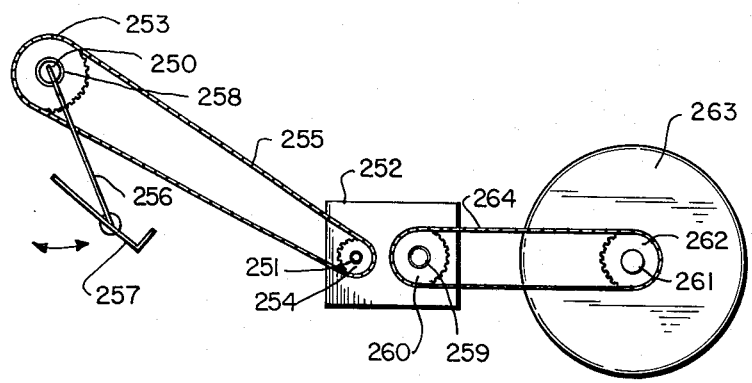
FIGS. 6, 7 and 8 are schematic diagrams of alternate drive system embodiments.

FIG. 6 illustrates diagrammatically another drive system embodiment according to the invention. In this embodiment, a pedal driven shaft 250 supported on the vehicle frame, substantially parallel to the input shaft 251 of transmission 252. Shaft 250 is located toward the front of the vehicle and above transmission 252. A sprocket 253 is secured rigidly to shaft 250, and a second sprocket 254 is connected to the input shaft 251, sprockets 253 and 254 being interconnected by an endless chain 255. A pair of pedal crank levers 256 are each provided at one end with a one-way clutch 258 embracing shaft 250. Each lever is equipped at its lower end with a pedal 257. Clutch 258 is operative to interconnect lever 256 and shaft 250 when the lever 256 is swung forwardly about the axis of shaft 250. Rotation of the pedal drive shaft 250 in the counterclockwise direction (as viewed) about the drive shaft 250, however, causes no transfer or torque between lever 256 and shaft 250.

The output drive shaft 259 of transmission 252 is rigidly connected to an pnput drive sprocket 260. The rear axle 261 of the vehicle has an axle sprocket 262 attached thereto as well as at least one rear wheel 263. Interconnecting the output drive sprocket 260 with the rear axle sprocket 262 is the chain 264.

The drive system shown in FIG. 6 transfers substantially linear driving power applied to the pedals 257 into rotary power driving rear wheel 263. When the lever 256 is rotated about shaft 250 in a clockwise direction as viewed in FIG. 6, chain 255 causes input drive shaft 251 of transmission 252 to rotate. The transmission 252 transmits the rotary power at the input drive shaft 251 into rotary power at the output drive shaft 259, although the rotary velocity may be altered. Chain 263 transmits the rotary power from the output drive shaft 259 and its attached drive sprocket 260 to rear wheel 263. After the pedal crank lever 256 has been rotated in a clockwise direction about the pedal drive shaft 250, a constant force restoring spring (not shown) applies a force between the pedal crank lever 256 and the frame to rotate the lever 256 in a counter-clockwise direction about the pedal drive shaft 250. This restoring force returns the pedal 257 to a position in which the vehicle operator is able again to apply force to the pedal crank shaft 256.

Figure 7:
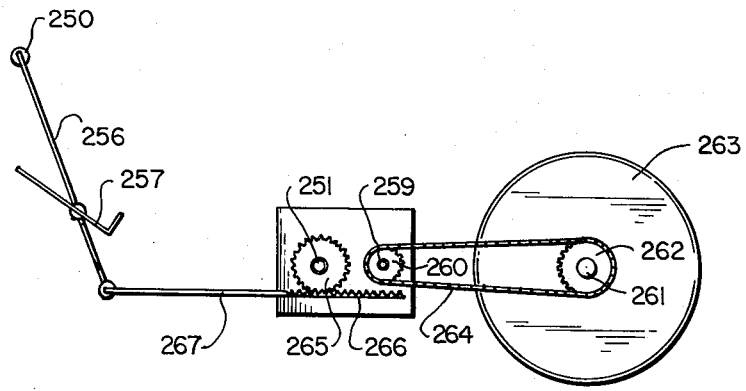

The propulsion system shown in FIG. 7 is a further modification of that already described. A pinion gear 265 is connected to a one-way clutch on the transmission input drive shaft 251, and meshes with a rack 266. Rack 266 has a cable 257 attached to one end, the cable extending between the rack 266 and the lower end of a pedal lever 256. Pedal lever 256 is mounted to swing about the axis defined by shaft 250. Lever 256 is swung forwardly by the application of force by the operator on pedal 257. Such movement of shaft 256 about shaft 250 causes cable 267 to move the rack 266 in a forward direction also. The substantially linear movement of the rack causes rotary motion of pinion 265 as an input to the transmission. Pinion 265 is equipped with a constant force return spring as hereinbefore described.

Figure 8:
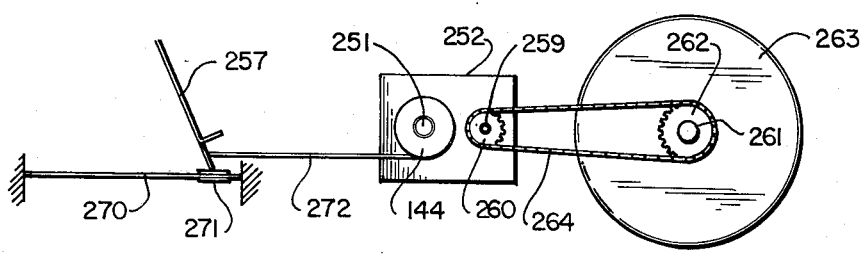

Another embodiment of the drive system is shown in FIG. 8, in which the input to the transmission 252 is essentially identical to that shown in FIG. 3 but the pedal mechanism is somewhat modified. Here, each pedal 257 is slidably mounted on a pedal guide bar or rod 270 by a sleeve 271 which embraces the guide bar or rod 270. The guide bar or rod 270 is so positioned on the vehicle as to permit the pedal 257 to be moved along a linear path designed to be comfortable for the operator. Pedal 257 has a cable 272 attached thereto near its lower end. Cable 272 extends rearwardly and is coiled around the drive cable reel 144. In operation, the forward thrusting of pedal 257 will be translated into a clockwise rotation of the drive cable reel 144, as has already been described with reference to FIG. 3, and will result in application of a driving force to the rear wheel 263. The spring return mechanism described in connection with FIG. 3 will operate to move the pedal 257 in a rearward direction after the force applied to pedal 257 has been removed.

THE EMBODIMENT OF FIGS. 9–19

Figure 11:
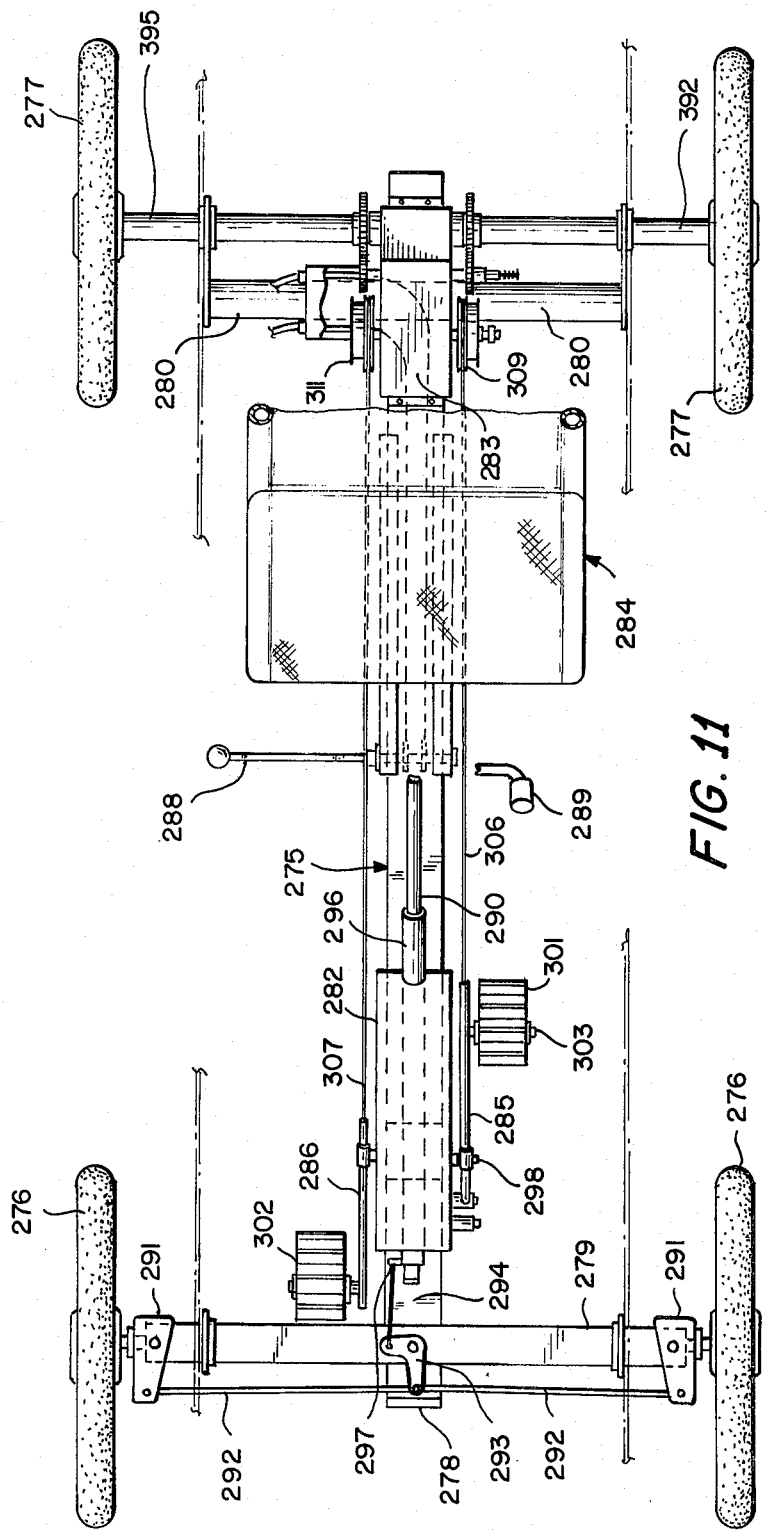
FIG. 11 is a top plan view of the vehicle structure shown n FIG. 10.

FIGS. 9-19 illustrate the invention as applied to a vehicle having two driven wheels. As seen in FIGS. 9–11, the vehicle comprises a frame indicated generally at 275 and supported by steerable front wheels 276 and two driven rear wheels 277. Frame 275 consists of a single longitudinal beam 278 in the form of a hollow aluminum extrusion of square transverse cross-section, a tubular front transverse member 279 rigidly secured at its midpoint to beam 278, as by welding, a tubular rear transverse member 280 which extends through beam 278 and is secured rigidly thereto, an upright 281 secured rigidly to beam 278 and projecting upwardly therefrom and a hollow support member 282 of rectangular transverse cross-section secured rigidly to the upper end of upright 281 and projecting rearwardly, and slightly upwardly, therefrom. A change speed transmission 283 is rigidly mounted on the top of beam 278 near the rear end thereof. A seat 284 is mounted on beam 278 just forward of the transmission. Two pedal levers 285 and 286 are pivotally mounted on support member 282 and depend therefrom, each on a different side of beam 278. A brake pedal lever 287 is accommodated by centrally located slots in beam 278 and projects upwardly therefrom in a location just to the rear of upright 281. A gear shift lever 288 is journalled on beam 278 and projects upwardly therefrom in a location just forward and to the right of the seat. The steering mechanism includes a yoke type handle 289 secured to a shaft 290 extending through and rotatably supported by member 282.

Front wheels 276 are each supported by an axle carried by a support member 291 which is mounted on the corresponding end of member 279, FIG. 11, for swinging movement about a substantially vertical axis. Support members 291 are connected by the rods 292 to one arm of a bell crank 293 which is mounted on member 279 at the midpoint thereof to pivot about an upright axis. The remaining arm of bell crank 293 is connected by a rod 294 to one arm of a second bell crank 295 which is mounted on upright 281 to pivot about a horizontal axis. Steering shaft 290 is telescopically engaged in a tubular shaft 296 and is releasably secured thereto to provide for adjustment of the position of handle 289 relative to the seat. The combination of shafts 290 and 296 extends longitudinally through support member 282 and is journalled thereon for rotary movement about the common axis of the two shafts. Shaft 296 projects forwardly from member 282 and has rigidly secured thereto a radially projecting lever arm 297. The remaining arm of bell crank 295 is connected to lever arm 297 by rod 297a. Accordingly, rotation of the combination of shafts 290 and 296 by handle 289 is translated into simultaneous swinging movement of axle support members 291 to steer the vehicle.

Pivotal mounting of pedal levers 285, 286 is accomplished by a common shaft 298 extending transversely through the sidewalls of support member 282 and secured thereto in a location below steering shaft 290, the ends of shaft 298 projecting laterally from member 282 and the upper end portions of levers 285, 286 being carried thereby and projecting upwardly therefrom so as to be able to engage rearward motion limiting bumpers 299, FIG. 10, secured to member 282. Forward motion limiting bumpers 300 are secured to the upper end portion of upright 281. Pedal levers 285, 286 are of such length that their lower end portions can traverse an arc beside beam 278. Pedals 301, 302 are identical and are mounted on the lower end portions of the respective levers 285, 286 for swinging movement about a horizontal axis indicated at 303, FIG. 10. Each pedal comprises a tread portion 304, to be engaged by the sole of the user's shoe, and a rearwardly projecting heel support 305 provided to support part of the weight of the user's leg. Pedals 301, 302 are located immediately beside and outwardly of the respective arms 285, 286 and the lower ends of the lever arms extend to a point adjacent heel supports 305. The forward end of a flexible cable 306 is attached to the lower end of lever 285 and a cable 307 is similarly attached to the lower end of lever 286, the cables running rearwardly beside beam 278. Cable 306 extends under an idler pulley 308 mounted on beam 278 and thence upwardly to reel 309 of transmission 283. Similarly, cable 307 runs under idler pulley 310, FIG. 11, and thence upwardly to reel 311 on the opposite side of the transmission. A tension spring 312, FIG. 10, is connected between the upper end of pedal lever 285 and a point on member 282 rearwardly of pivot shaft 298, to bias lever 285 to swing pedal 301 forwardly. Lever 296 is equipped with a biasing spring in the same fashion.

As seen in FIGS. 15–17, transmission 293 includes a casing having side walls 315, FIG. 16, a front end wall 316 and a rear end wall 317, the end walls having flanges 318 by which the housing is rigidly mounted on the upper side of longitudinal frame beam 278. The casing is divided into upper and lower sections A and B, as shown in FIGS. 15 and 16 for ease of assembly. The sections are fastened together with brackets 318A and 318B at one end and with a like bracket at the other end. A tubular input shaft 319 and a tubular output shaft 320 are provided, each being of sufficient length to project through and beyond the respective side walls 315. Input shaft 319 is supported for free rotation by ball bearings 321, and output shaft 320 is similarly supported by ball bearings 322. One end portion of input shaft 319 carries the combination of cable reel 308, a one-way clutch 323, and a constant force spiral spring 324, clutch 323 being press-fit into the hub of reel 308 and projecting outwardly therefrom to support a retaining plate 325, spring 324 being located between plate 325 and the adjacent face of reel 308. The opposite end portion of shaft 319 similarly carries the combination of cable reel 311, a one-way clutch 326 and a constant force spiral spring 327. As shown in FIG. 15, the outer end of spiral spring 324 is secured to a pin 328 fixed to and projecting from the adjacent side wall 315. An additional metal strap 329 has one end rivetted to the outer surface of spring 324 in a location 180° from the end of the outer turn of the spring, the other end of strap 329 being secured to a pin 330 fixed to and projecting from the adjacent side wall 315, the strap being tangential relative to the outer turn of the spring. The inner end of spring 324 is secured to clutch 323 and, therefor, to reel 308. The relation of spring 327 to reel 311, clutch 326 and the adjacent side wall 315 is identical to that just described for spring 324.

Cables 306 and 307 have their ends secured to the hubs of the respective reels 309, 311 and are wrapped in the narrow peripheral grooves of the reels. Typically, about 1.5 turns of the cable are wrapped on the reel when the corresponding pedal lever 285, 286 is in its rearmost position and the cable is taut. As will be apparent from FIGS. 10 and 15, the cable passes under the respective idler pulley 308, 310 and then clockwise about the respective reel 309, 311, so that swinging of the pedal lever forwardly to unwind the cable will rotate the reel counterclockwise (as viewed in FIG. 15). Springs 324, 327 are arranged to be wound when the reels turn counterclockwise, and unwinding of the cables therefore stores energy in the springs which, when released, will rotate the reels in a clockwise direction to rewind the cables and return the pedal levers to their neutral position. Clutches 323 and 326 are arranged to connect the reels to shaft 319 when the reels turn counterclockwise, and to free the reels from the shaft when the reels turn clockwise.

Tubular shaft 319 forms part of an input shaft assembly comprising a shift rod 331, FIG. 16, a key 332, a coupling 333 which secures rod 331 to a shift cable 334 but leaves the rod free to rotate about its axis, a detent mechanism indicated generally at 335, forward gearrs 336–340, reverse gear 341, spacer rings 342–348, and a spacer sleeve 349. Gears 336–341 are spur gears continuously meshed with the respective spur gears of the output shaft assembly as later described. The inner diameters of gears 336–341 are slightly greater than the outer diameter of tubular shaft 319, and the inner periphery of each gear is interrupted by a plurality of angularly spaced notches dimensioned to snugly accommodate the tip of key 332, one such notch being indicated at 350. Rings 342–346 and 348 are flat rings of rigid antifriction material, with outer diameter smaller than the smallest gear and with inner diameter bevelled to constitute cams to be engaged by the tip of key 332 during shifting. Spacer 347 is thick and has an inner peripheral groove of such width as to freely accommodate the tip of key 332, in the fashion seen in FIG. 16, when the transmission is in neutral. Shaft 319 projects well beyond clutch 323, and detent mechanism is carried by the exposed end portion of the shaft. The detent mechanism comprises a collar 351 which surrounds and is fixed to shaft 319, the wall of the tubular shaft having diametrically opposed ports to accommodate two detent balls 352. Collar 351 has diametrically aligned bores accommodating helical compression springs 353 each retained in the respective bore to yieldably bias a different one of balls 352 inwardly into engagement with one of the transverse annular detent grooves 354 provided on shift rod 331. There are seven grooves 354 arranged in a longitudinal series along the shift rod, each adjacent pair of grooves being spaced apart by a distance equal to the sum of the thicknesses of one gear 336–341 and two spacer rings 342–346.

Tubular shaft 319 is provided with a straight longitudinal slot 355 extending throughout the length of the shaft occupied by the gears 336–341. As best seen in FIG. 18, key 332 comprises a main body 356 of a length less than the inner diameter of tubular shaft 319. Body 356 is slidably disposed in a transverse bore in shift rod 331. A blind bore opens through one end of body 356 and accommodates a helical compression spring 357 and a pin 358, the head 359 of pin 358 engaging the exposed end of spring 357 and being rounded for low friction engagement with the inner surface of shaft 319. At its opposite end, body 356 has an integrally formed tip 360 which is of a thickness to be accommodated by slot 355 for free movement therein and a width such that tip 360 can be snugly accommodated in the spaces defined by the combination of a notch 350 in any of gears 336–341 and the bevelled inner peripheral surfaces presented by the two of the spacers 342–348 associated with that gear. Key 332 is installed by being inserted through a port 361 in shaft 319, the port being opposite an end portion of slot 355 in the end portion of the shaft surrounded by spacer sleeve 349.

Opposite detent mechanism 335, shift rod 331 has an end portion of reduced diameter which is surrounded by the cylindrical wall of a cup-shaped connector member 362, the cylindrical wall and the end portion of the rod being rigidly interconnected by a cross-pin, as shown. The end wall of connector member 362 is spaced from the end of rod 331 and provided with a central opening which accommodates an end portion 363 of one flexible shift cable 334. End portion 363 has an enlarged head 364 of transverse dimensions too large to pass through the opening in the end wall of the connector member. The axial dimension of head 364 is such that the head substantially fills the space between the end of rod 331 and the end wall of connector 362. Accordingly, movement of cable 334, by shift lever 288, FIG. 10, as later explained, is translated into movement of rod 331 axially relative to shaft 319, with key 332 moving with the shift rod. Each detent groove 354 corresponds to a different one of gears 336–340 spacer ring 347, and gear 341. Detent mechanism 335, gears 336–341, ring 347, the grooves 354, and key 332 are so located that, whenever detent balls 352 are engaged in any particular one of the grooves 354, the tip 360 of key 332 will extend into engagement with a corresponding particular one of gears 336–340, spacer ring 347, and gear 341. Thus, with balls 352 engaged in the second (from the right as viewed in FIG. 16) groove 354, tip 360 of the key is engaged in the continuous internal groove of spacer ring 347 so that, shaft 319 being connected to none of the gears 336–341, the transmission is in neutral. If rod 331 is shifted to the left, as viewed in FIG. 16, to bring the detent balls 351 into engagement with the one of the grooves 354 nearest the free end of rod 331, as shown in FIG. 16A, key tip 360 then engages in a notch 350 in reverse gear 341, placing the transmission in reverse. Longitudinal movements of rod 331 causes key tip 360 to engage the camming surfaces presented at the inner peripheries of spacers 342–348 so that, in shifting from one gear to another, or to the "neutral" spacer 347, key 332 is forced transversely of rod 331 to allow tip 360 to pass the corresponding spacer, spring 357 then acting to shift tip 360 outwardly again into engagement with the next notch 350 or the groove presented by neutral spacer 347.

Tubular output shaft 320 forms part of an output shaft assembly comprising shift rod 365, key 366, coupling 367, detent mechanism 368, forward gears 369–373, reverse gear 274, spacer rings 375–381, and a spacer sleeve 382. Key 366 is identical to key 332 and cooperates with a slot in shift 320 and notches 383 in gears 369–374 and a groove in neutral spacer ring 380 in the same fashion described with reference to the input shaft assembly. Forward gears 369–373 are in constant mesh with the forward gears 336–340, respectively, of the input shaft assembly. For the reverse gearing, an idler gear 384, supported from the adjacent sidewall 315 by shaft 385 on boss 386, the idler gear being constantly in mesh with gears 341 and 374. Shift rod 365 has seven grooves 387 to cooperate with the balls of detent mechanism 368 as described with reference to the input shaft assembly. Coupling 367 connects the end of shift rod 365 to a shift cable 388.

Outboard of detent mechanism 368, shaft 320 carries a spur gear 389, the gear and shaft being interconnected by a conventional one-way clutch 390. Gear 389 is meshed with a gear 391 keyed to one rear axle 392. On the opposite side of the transmission, shaft 320 carries a spur gear 393 which, as shown in FIG. 16, is meshed with a gear 394 whenever the transmission is in any forward gear or in neutral but, as shown in FIG. 16A, is shifted out of mesh with gear 394 when the transmission is in reverse. Gear 394 is keyed to the second rear axle 395. Gear 393 and shaft 320 are interconnected by a conventional one-way clutch 396 constructed to allow the combination of gear 393 and clutch 396 to slide freely on shaft 320 in axial directions between the two positions shown in FIGs. 16 and 16A.

The axial position of gear 389 on shaft 320 is fixed by conventional retainers at 397, 398, FIG. 16, and shaft 320 projects well beyond gear 389. Shift rod 365 has an elongated plain end portion 365a which projects beyond tip 320a of the output shaft. Since one-way clutches 390 and 396 are oriented to engage between shaft 320 and gears 389 and 393 only when shaft 320 is rotating clockwise (as viewed in FIG. 15) so that gears 391, 394 rotate counterclockwise, to drive the vehicle forwardly, it is necessary to by-pass one of the one-way clutches 390, 396 in order to drive the vehicle in reverse. This is accomplished by providing the hub of gears 389 with a tubular extension formed with two diametrically opposed axially open notches 399, FIG. 16, adapted to receive two diametrically opposed teeth 400 on a by-pass clutch sleeve 401 which is axially slidable on the end portion of shaft 320 but keyed thereto, at 402, so as to rotate with the shaft. The outer portion of sleeve 401 is of reduced diameter to provide a shoulder facing retainer 398, and a helical compression spring 403 is engaged between that shoulder and retainer 398 to bias sleeve 401 outwardly against a retaining ring 404 on shaft 320a. An actuating sleeve 405 is carried by portion 365a of the shift rod and has a tubular skirt surrounding retaining ring 404 and engaging the outer end of clutch sleeve 401. A ring 406 is secured to portion 365a of the shift rod near the end thereof, and a helical compression spring 407 is interposed between the end of actuating sleeve 405 and ring 406. A motion limiting sleeve 408 embraces rod portion 365a between ring 406 and actuating sleeve 405 and is shorter than the relaxed length of spring 407. Spring 407 is stronger than spring 403 and is relaxed when rod 365 is in the neutral position.

For all positions of shift rod 365 save reverse, spring 403 maintains actuator sleeve 405 and clutch sleeve 401 in their inactive positions (FIG. 16) so that teeth 400 cannot engage in notches 399. Under these conditions the transmission is effective to drive either rear axle in a direction to move the vehicle forwardly, and the one-way clutches 390, 396 are effective to disconnect either rear axle from the transmission if that axle is rotating counterclockwise (as viewed in FIG. 15) more rapidly than shaft 320 is rotating clockwise. Thus, clutches 390, 396 provide both "free wheeling" and a differential-like action whenever the transmission is in any forward gear or neutral. When rod 365 is moved to the reverse position shown in FIG. 16A, the resulting compressive force on spring 407 causes actuating sleeve 405 to move clutch sleeve axially toward gear 389, with teeth 400 engaging in notches 399 so that shaft 320 is connected directly to gear 389 via key 402 and clutch sleeve 401, one-way clutch 390 thus being ineffective. As rod 365 reaches the position seen in FIG. 16A, the end of sleeve 408 engages the end of actuator sleeve 404 to lock clutch sleeve 401 in its engaged position. With the parts in the positions shown in FIG. 16A, spring 403 is compressed. Since one-way clutch 390 has now been by-passed, operation of either or both pedal lever 285, 286 will drive gear 391 and rear axle 392 in directions to move the vehicle in reverse.

With reverse power applied to one rear wheel 277 via axle 392, it is possible for the other rear wheel to exceed the rotational velocity of the driven wheel, such a condition arising if the vehicle is being turned as it is driven in reverse. Under those circumstances, the non-driven rear wheel would, in effect, drive the transmission via clutch 396 so long as gears 393 and 394 are meshed, and the end result would be that the non-driven rear wheel would lock and skid. To avoid this, gear 393 is shifted out of mesh with gear 394, leaving axle 395 completely free to rotate, whenever the transmission is shifted to reverse.

The hub of gear 393 is embraced by the cylindrical wall of a cup-shaped member 410 which is secured rigidly to the hub, as by set screw 411. A compression spring 412 is engaged between the transverse wall of member 410 and bracket 413, which positions cables 334, 388. Surrounding cable 388, spring 412 urges the combination of gear 393 and one-way clutch 396 against a retaining ring 414, as seen in FIG. 16, whenever rod 365 is in its neutral or any forward position. Gear 393 is meshed with gear 394 under these circumstances. A rigid sleeve 415, surrounding the end portion of cable 388 and located within shaft 320, is interposed between coupling 367 and the transverse wall of member 410, the length of sleeve 415 being equal to the space which exists between coupling 367 and the transverse wall of member 410 when rod 365 is in its neutral position. Whenever rod 365 is moved to its reverse position, sleeve 415 is moved with the shift rod, causing gear 393 to be shifted outwardly on shaft 320 until that gear is out of mesh with gear 394, as shown in FIG. 16A, and spring 412 is compressed. When rod 365 is returned to its neutral position, spring 412 relaxes, urging the combination of gear 393 and clutch 396 into engagement with retaining ring 414, gear 393 again being meshed with gear 394.

While all gear sets, e.g., gears 336 and 369, within the transmission are in constant mesh, only that pair of gears selected by the shift mechanism is locked to the shafts 319, 320. Accordingly, for any active condition of the transmission, only one pair of gears is driven, and the remaining transmission gears "float", so that there is a minimum power loss within the transmission.

From bracket 413, shift cables 334, 388 are led to beam 278 and forwardly thereunder to the location of gear shift lever 288. As shown in FIG. 14, shift lever includes a horizontal portion 417 which extends through the sidewalls and is journalled on beam 278. Two mutually parallel lever arms 418, 419 located within beam 278 are secured rigidly to portion 417 and depend therefrom, passing through a suitable slot in the bottom wall of the beam and projecting therebelow. The forward end of cable 334 is secured to lever arm 418. The forward end of cable 388 is secured to lever arm 419. Cables 334 and 388 are of the same effective length and, since movement of arms 418, 419 in sinultaneous, the two shift rods 333 and 365 are moved simultaneously, in the same direction and through the same distance, whenever the operator moves the shift lever 288. Though the actuating movements applied to shift rods 333, 365 by the shift cables are not entirely precise, the small differences are compensated for by the action of the detent mechanism 351 and 368.

For braking, two conventional disc brakes 420, FIGS. 10 and 17, of the general type disclosed in U.S. Pat. No. 3,358,793, issued Dec. 19, 1967 to Hollangel et al., are employed. Each brake 420 employs a different one of the gears 391, 394 as the brake disc. The brakes are mounted on the respective sides of beam 278 and operated by pivot arms 421 through brake cables 422 which extend forwardly and are connected to brake lever 287 within the confines of beam 278.

Referring to FIGS. 11, 16 and 19, each rear axle 392, 395 is supported at its inner end by the transmission housing and thus by beam 278, and at an intermediate point by one of the bracket plates 423 rigidly secured to the respective ends of transverse frame member 280. Since the supports for both rear axles are the same, only that for axle 392 will be described. The inner end ferrule 424 of the axle is journalled in a ball bearing 425 carried by a tubular mount 426 secured to side plate 315 of the transmission housing. Bearing 425 is restrained against axial movement relative to plate 315, by retaining rings 427. The axle is restrained against axial movement by retaining ring 428 and a cooperating shoulder on ferrule 424. Gear 391 is keyed to ferrule 424 and is engaged between a shoulder 429 on the ferrule and a spacer ring 430, so that the axial position of the gear is fixed.

Brackets 423 are in the form of flat plates welded each to a different end of member 280 and lying in substantially vertical planes parallel to the main frame beam 278. In a location aligned horizontally with the center of bearing 425, bracket 423 has a circular opening 431, FIG. 19, snugly accommodating a ball bearing 432. The body shell 433, FIGS. 9 and 10 of the vehicle is of polymeric sheet material and comprises a lower thermoformed portion 433a and an upper thermoformed portion 433b, the two portions having mating peripheral flanges secured together, as by bolts 434, FIG. 10. Lower shell portion 433a has an upright side wall portion 435, FIG. 19, provided with opening 436 within which bearing 432 is disposed, opening 436 being larger than the bearing so that the bearing does not engage the body shell. An outer plate 437 is provided, shell portion 435 extending between bracket 423 and plate 437. The bracket and plate are secured together by a plurality of fasteners, indicated generally at 438, arranged in a circular series spaced outwardly from opening 436. Each fastener 438 comprises a bolt 439, a spacing sleeve 440, a washer 441, a nut 442 and a resiliently compressible grommet 443. Aligned openings are provided in plate 437, shell portion 435, and bracket 423, the opening in plate 437 snugly embracing the shank of bolt 439, the opening in shell portion 435 being markedly larger than the outer diameter of sleeve 440, and the opening in bracket 423 snugly embracing the sleeve. Grommet 443 is interposed between sleeve 440 and the wall of the opening in shell portion 435 and is of a relaxed length greater than the space between plate 437 and bracket 420 in the completed assembly. The nut and bolt are tightened until sleeve 440 is clamped between plate 437 and washer 441, with the washer bearing against the inner face of bracket 423. Grommet 443 is compressed axially and, as a result, is placed in compression between sleeve 440 and the surrounding wall of the opening in shell portion 435. The outer ring of bearing 432 is transversely grooved and provided with a retaining ring 444 which, in the completed assembly, bears against the outer face of bracket 423, the distance between ring 444 and outer end of bearing 432 being such that the outer end of the bearing is forced against the inner face of plate 437, so that the bearing is rigidly retained on bracket 423.

At the front of the vehicle, transverse frame member 279 has rigidly secured thereto at each end a bracket plate 445, the lower body shell portion 433a being secured to plates 445 by plates 437 and fasteners 438 as just described with reference to FIG. 19. Accordingly, the body shell is attached to frame 275 only via the resilient grommets 443 and brackets 423, 445.

Seat 284 is mounted on main frame beam 278 by means of a transverse member 448, FIGS. 10 and 13, a longitudinally extending central member 449 of inverted U-shaped transverse cross-section, member 449 being secured rigidly to the bottom of member 448, and two longitudinal members 450 which are of L-shaped transverse cross-section and are each rigidly secured to beam 278 so that the long arm of the L overlies one side of the beam and the short arm of the L is spaced above the top of the beam. The width of member 449 is such that the same is accommodated in the space immediately above the top wall of beam 278 and between members 450. At its forward end, member 449 is provided with a cross-shaft 451 the ends of which project outwardly from member 449. A nylon block 452 is provided at each end of shaft 451, each block filling the space between the horizontal flange of the corresponding member 450 and the top wall of beam 278. The seat can thus be pivoted about the axis of shaft 451 and moved forwardly or rearwardly along beam 278, within the length of members 450. To lock the seat to beam 278 against longitudinal movement, a pin 453 is rigidly secured to member 449 near the rear thereof and projects downwardly therefrom, and the top wall of beam 278 is provided with a plurality of holes spaced lengthwise of the beam and each dimensioned to accommodate the pin.

What is claimed is:

1. In an occupant-propelled vehicle, the combination of
a frame;
running gear carried by said frame and including at least one driven wheel;
a seat mounted on said frame and comprising
a generally horizontal seat portion, and
a back support extending upwardly from said seat portion;
two pedals located in front of said seat and each mounted for movement between a first position, which is nearer said seat, and a second position, which is further from said seat,
said first and second positions being spaced apart longitudinally of the vehicle in a generally horizontal plane which passes adjacent to said seat portion;
a change-speed transmission mounted on said frame and comprising
an input shaft,
an output shaft, and
gearing interconnecting said input and output shafts;
first motion transfer means interconnecting said output shaft of said transmission and said at least one driven wheel and comprising
first overrunning clutch means oriented to cause said first motion transfer means to rotate said at least one driven wheel only when said output shaft of said transmission is turned in that direction which will cause said at least one driven wheel to move the vehicle forwardly;
second motion transfer means interconnecting said pedals and said input shaft of said transmission and comprising
second overrunning clutch means oriented to rotate said input shaft in a direction to drive the vehicle forwardly when at least one of said pedals is moved from said first position toward said second position; and
constant force spring restoring means connected to return said pedals toward said first position.

2. The combination defined in claim 1 and further comprising
two levers mounted on said frame in front of said seat for swinging movement about an axis spaced a substantial distance above said seat portion of said seat,
said levers depending from said axis, and
said pedals each being mounted on a different one of said levers adjacent the lower end thereof;
said second motion transfer means comprising
two reels, and
two cables each having one end portion wound on a different one of said reels and the other end connected to a different one of said levers,
said second overrunning clutch means comprising two overrunning clutches, each of said reels being connected to said input shaft of said transmission via a different one of said clutches of said second overrunning clutch means;
said restoring means comprising two spiral constant force springs each operatively connected to a different one of said reels.

3. The combination defined in claim 2, wherein
said frame comprises at least one longitudinally extending frame member which is at least substantially horizontal;
said seat is mounted on said at least one frame member with said seat portion immediately adjacent thereto; and
said transmission is mounted on said at least one frame member behind said seat.

4. The combination defined in claim 3, wherein
said at least one frame member is a single centrally located member;
said levers are mounted to move in mutually parallel paths each located on a different side of said centrally located frame member; and
said running gear comprises two steerable front wheels and two driven rear wheels,
said wheels being carried by axles which are supported by said centrally located frame member.

5. The combination defined in claim 3, wherein
said running gear comprises
two driven rear wheels, and
two mutually independent rear axles each supporting a different one of said rear wheels; and
said first motion transfer means comprises
two rotary drive elements each connected to drive a different one of said independent rear wheel axles,
said second overrunning clutch means comprising two overrunning clutches each connecting said output shaft of said transmission to a different one of said rotary drive elements.

6. The combination defined in claim 5, wherein
said transmission comprises reverse gearing,
the combination further comprising
means responsive to shifting said transmission to reverse for by-passing the one of said overrunning clutches of said second overrunning clutch means which connects said output shaft of said transmission to one of said rotary drive elements and for simultaneously deactivating the other of said rotary drive elements.

7. The combination defined in claim 1, wherein
said second motion transfer means comprises
a pinion,
an overrunning clutch forming part of said second overrunning clutch means, said pinion being mounted on said input shaft via said overrunning clutch, and a rack meshed with said pinion, said rack extending generally in the direction of movement of said pedals and being connected to one of said pedals for movement thereby.

8. The combination defined in claim 1, wherein said second motion transfer means comprises an elongated crank arm, means at one end of said crank arm supporting the same foreswinging movement about a fixed axis, one of said pedals being mounted on said crank arm, a sprocket, an overrunning clutch forming part of said second overrunning clutch means and operatively interposed between said crank arm and said sprocket, and means connecting said sprocket to drive said input shaft.

9. In an occupant propelled vehicle, the combination of a wheeled frame;

a seat located on said frame intermediate the ends thereof and comprising a back support and a seat portion;

two foot pedals;

means mounting said pedals on said frame in a location in front of said seat for fore and aft movement along mutually parallel paths between a first position, nearer said seat, and a second position, further from said seat;

a change-speed transmission mounted on said frame in a location at the rear of the vehicle, said transmission comprising an input shaft, an output shaft, and gearing interconnecting said input and output shafts;

two mutually independent motion transfer devices each arranged to connect a different one of said pedals to said input shaft of said transmission whenever the pedal is moved forwardly, each of said motion transfer devices comprising a rotary element, an overrunning clutch oriented to impart rotary motion from said rotary element to said input shaft of said transmission when the corresponding pedal is moved forwardly, a constant force spring means connected to said rotary element to store energy when said rotary element is turned as a result of forward movement of the corresponding pedal, and means connecting the respective one of said pedals to operate said rotary element;

said means mounting said pedals on said frame being operative to allow the pedals to move forwardly from an initial position through a predetermined distance, said constant force spring means of said motion transfer devices being operative to turn said rotary elements and restore the respective pedals to their initial positions;

said pedals being so arranged that said first and second positions lie in a generally horizontal reference plane;

said seat being so arranged that said seat portion is immediately above said reference plane, the location of said seat being such that, when an occupant is seated thereon with one foot engaged with the corresponding one of said pedals and the pedal is in said initial position, the occupant's leg will be bent at the knee at an angle approximating 90°, the length of forward travel allowed the pedal being adequate to enable the occupant to substantially straighten his leg when thrusting the pedal forwardly; and means interconnecting the output shaft of said transmission to drive at least one wheel of the vehicle in a direction to cause the vehicle to move forwardly whenever the input shaft of the transmission is turned as a result of forward movement of at least one of said pedals.

* * * * *